(12) United States Patent
Shasha et al.

(10) Patent No.: US 11,523,399 B2
(45) Date of Patent: Dec. 6, 2022

(54) SYSTEM, METHOD AND COMPUTER-ACCESSIBLE MEDIUM FOR PREDICTING WIRELESS SIGNAL DEGRADATION

(71) Applicant: New York University, New York, NY (US)

(72) Inventors: Dennis Shasha, New York, NY (US); Aditya Dhananjay, Brooklyn, NY (US); Marco Mezzavilla, Brooklyn, NY (US); Sundeep Rangan, Jersey City, NJ (US)

(73) Assignee: New York University, New York, NY (US)

( * ) Notice: Subject to any disclaimer, the term of this patent is extended or adjusted under 35 U.S.C. 154(b) by 0 days.

(21) Appl. No.: 16/582,019

(22) Filed: Sep. 25, 2019

(65) Prior Publication Data

US 2020/0100256 A1    Mar. 26, 2020

Related U.S. Application Data

(60) Provisional application No. 62/736,040, filed on Sep. 25, 2018.

(51) Int. Cl.
| | |
|---|---|
| *H04W 72/08* | (2009.01) |
| *H04W 16/18* | (2009.01) |
| *H04W 72/04* | (2009.01) |
| *H04W 16/28* | (2009.01) |

(52) U.S. Cl.
CPC ......... *H04W 72/085* (2013.01); *H04W 16/18* (2013.01); *H04W 16/28* (2013.01); *H04W 72/044* (2013.01)

(58) Field of Classification Search
CPC . H04W 72/085; H04W 16/18; H04W 72/044; H04W 16/28; H04W 24/08; H04L 1/20; H04L 5/0048; H04L 5/0023; H04L 5/006; H04B 7/04
See application file for complete search history.

(56) References Cited

U.S. PATENT DOCUMENTS

| | | | | |
|---|---|---|---|---|
| 2011/0058535 | A1* | 3/2011 | Djahanshahi | G01S 7/021 370/338 |
| 2014/0016495 | A1* | 1/2014 | Li | H04B 7/0408 370/252 |
| 2014/0225775 | A1* | 8/2014 | Clevorn | H01Q 3/34 342/372 |
| 2014/0349568 | A1* | 11/2014 | Niemela | H04K 3/88 455/1 |

(Continued)

*Primary Examiner* — Sharmin Chowdhury
(74) *Attorney, Agent, or Firm* — Hunton Andrews Kurth LLP

(57) ABSTRACT

An exemplary system, method and computer-accessible medium for determining a degradation(s) of a wireless link(s) can be provided, which can include, for example, periodically determining a wireless channel quality of the wireless link(s) between a sender and a receiver, recording a history of the wireless channel quality, determining whether a plurality of diffractive pulses are present based on the history and determining the degradation(s) based on the presence of the plurality of diffractive pulses. The wireless channel can be in a beam-forming direction. The degradation(s) can be an impending degradation.

17 Claims, 10 Drawing Sheets

(56) References Cited

U.S. PATENT DOCUMENTS

| | | | |
|---|---|---|---|
| 2015/0038156 A1* | 2/2015 | Kilpatrick, II | H04W 68/02 |
| | | | 455/452.1 |
| 2017/0085396 A1* | 3/2017 | Hu | H04L 5/0007 |
| 2017/0286328 A1* | 10/2017 | Grosse-Puppendahl | |
| | | | G06F 11/3051 |
| 2018/0248634 A1* | 8/2018 | Pascolini | H01Q 1/273 |
| 2019/0260406 A1* | 8/2019 | Medbo | H04L 27/265 |
| 2019/0364492 A1* | 11/2019 | Azizi | H04W 52/0264 |

* cited by examiner

SYSTEM, METHOD AND COMPUTER-ACCESSIBLE MEDIUM FOR PREDICTING WIRELESS SIGNAL DEGRADATION

CROSS-REFERENCE TO RELATED APPLICATION(S)

This application relates to and claims priority from U.S. Patent Application No. 62/736,040, filed on Sep. 25, 2018, the entire disclosure of which is incorporated herein by reference.

FIELD OF THE DISCLOSURE

The present disclosure relates generally to a wireless access system, and more specifically, to exemplary embodiments of an exemplary system, method and computer-accessible medium for predicting a wireless signal degradation.

BACKGROUND INFORMATION

Higher frequency radio waves (e.g., millimeter wave frequencies) have three main propagation characteristics: i) the signals suffer from high free-space or isotropic path losses; ii) the signals are easily blocked by objects in the environment; and ii) some objects in the environment lead to highly specular reflections of these signals. To overcome the high isotropic path losses, communication systems that operate over these frequencies are characterized by highly directional beams. When a blockage takes place, the beam directions need to be switched to alternate specular signal paths in order to maintain the communication link.

FIGS. 1-3 show block diagrams of wireless communication links between transmitter ("TX") 105 and receiver ("RX") 110. In particular, FIG. 1 shows a wireless communication link between TX 105 and RX 110, where both TX 105 and RX 110 are capable of beamforming. Alternate embodiments include the case where only one end-point (e.g., either TX 105 or RX 110) are capable of beamforming. TX 105 and RX 110 pick transmission and reception directions (e.g., beam-forming directions) as shown, to be able to communicate with each other. FIG. 2 shows a communication link between TX 105 and RX 110 being blocked or degraded by an object (e.g., blocker 115) in the environment. Upon degradation of signal quality, TX 105 and RX 110 need to find new beam-forming directions to re-establish communications. FIG. 3 shows TX 105 and RX 110 after they have chosen alternate beam-forming directions, leveraging the presence of a reflector in the environment.

The problem with systems that behave as shown in the block diagrams of FIGS. 1-3 is that finding and switching to alternate beam-forming directions can take substantial time, especially when considering the additional time due to directional scanning and MAC-layer overheads. This problem can be exacerbated by the fact that in traditional systems, the beam-switching is reactive—meaning that that alternate beam-forming directions are chosen after the current link begins to show degradation in quality. Complicating matters further is that some specular signal paths between TX 105 and RX 110 can be correlated. Further, the blockage-induced degradation of the link in the currently chosen beam-forming directions means that the control-plane signaling itself (e.g., utilized to re-establish communications on alternate beam-forming directions) becomes more unreliable. Therefore, what is needed is a method to predict impending blockages early enough that the system has enough time to adapt (e.g., by scanning and choosing alternate beam-forming directions).

Thus, it may be beneficial to provide an exemplary system, method and computer-accessible medium for predicting wireless signal degradation, which can overcome at least some of the deficiencies described herein above.

SUMMARY OF EXEMPLARY EMBODIMENTS

An exemplary system, method and computer-accessible medium for determining a degradation(s) of a wireless link(s) can be provided, which can include, for example, periodically determining a wireless channel quality of the wireless link(s) between a sender and a receiver, recording a history(ies) of the wireless channel quality, determining whether a plurality of diffractive pulses are present based on the history(ies) and determining the degradation(s) based on the presence of the plurality of diffractive pulses. The wireless channel can be in a beam-forming direction. The degradation(s) can be an impending degradation.

In some exemplary embodiments of the present disclosure, the wireless channel quality can be determined based on a reference signal(s) in a transmission between the sender and the receiver. The wireless channel quality can be determined based on, e.g., a pilot signal(s) in a transmission between the sender and the receiver. The wireless channel quality can be determined in a time domain or a frequency domain. Noise in the wireless channel quality can be filtered out using a smoothing filter. The history(ies) can be recorded in a format of (i) a list, (ii) a queue, or (iii) an array.

In certain exemplary embodiments of the present disclosure, the history(ies) can be processed using a state machine. The degradation can be determined using (i) a statistical metric or (ii) a machine learning procedure. The determining of the degradation(s) can include a prediction of the degradation(s). The prediction can include a confidence factor. The history(ies) can include a plurality of histories, and a first history can be determined for different beam forming directions, a second history can be determined for different senders, and a third history can be determined for different receivers. A further wireless link(s) can be determined (i) between the sender and the receiver based on the degradation(s) or (ii) between the sender and a further receiver based on the degradation(s). A beam-forming direction between the sender and the receiver can be switched based on the degradation(s).

According to some exemplary embodiments of the present disclosure, the determining the degradation(s) can include determining a confidence value for an impending degradation. A further wireless link(s) between the sender and the receiver can be determined based on the confidence value, the further wireless link(s) between the sender and a further receiver can be determined based on the confidence value, or a beam-forming direction between the sender and the receiver can be switched based on the confidence value.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Further objects, features and advantages of the present disclosure will become apparent from the following detailed description taken in conjunction with the accompanying Figures showing illustrative embodiments of the present disclosure, in which.

Figure 1:
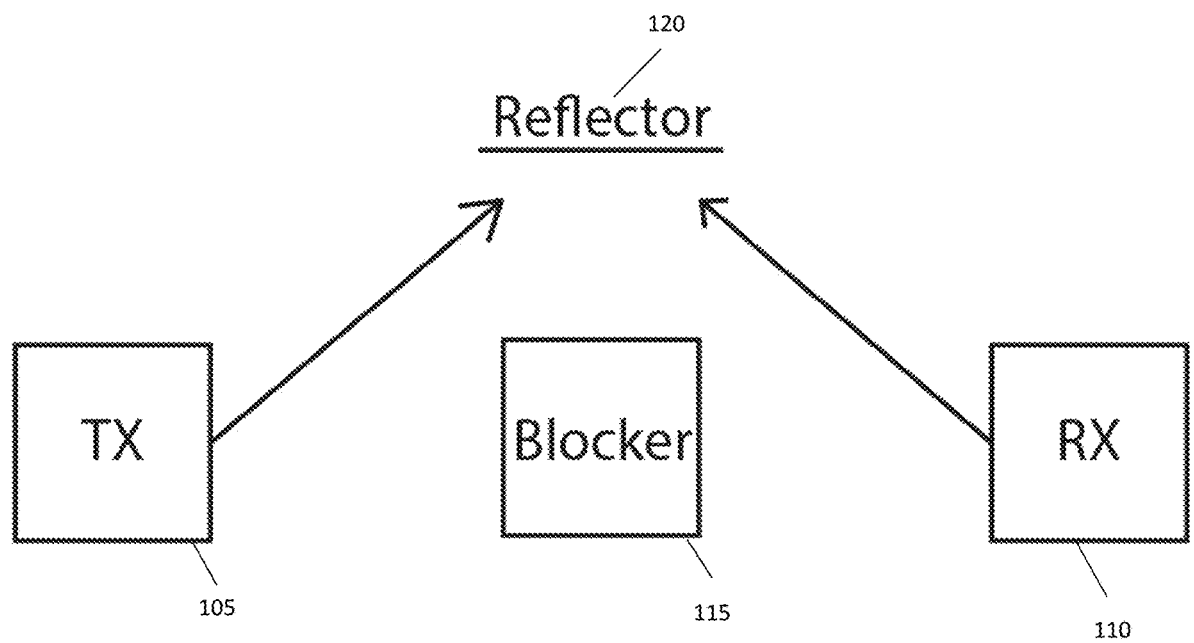
FIGS. 1-3 are schematic diagrams of wireless communication links between a sender and a receiver.
Figure 2:
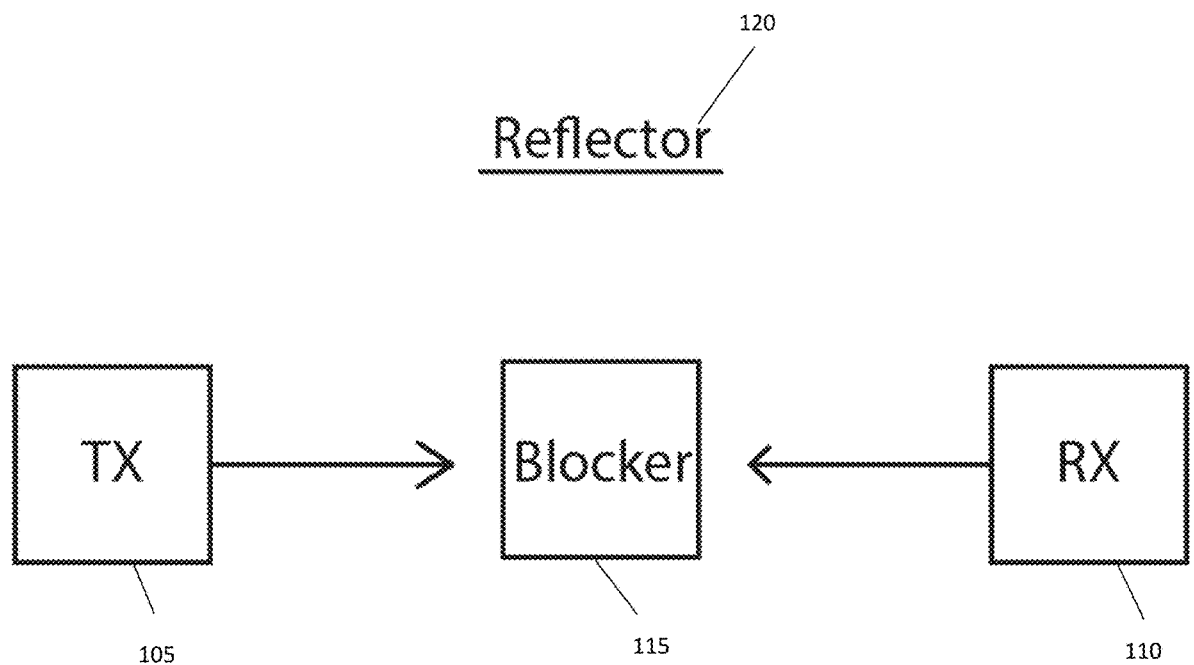
Figure 3:

Throughout the drawings, the same reference numerals and characters, unless otherwise stated, are used to denote like features, elements, components or portions of the illustrated embodiments. Moreover, while the present disclosure will now be described in detail with reference to the figures, it is done so in connection with the illustrative embodiments and is not limited by the particular embodiments illustrated in the figures and the appended claims.

DETAILED DESCRIPTION OF EXEMPLARY EMBODIMENTS

The exemplary system, method, and computer-accessible medium, according to an exemplary embodiment of the present disclosure, can be used to estimate the channel quality as follows: the transmission can contain a synchronization signal, such as the primary synchronization signal (e.g., PSS in $4^{th}$ Generation Long Term Evolution terminology) and/or the secondary synchronization signal (e.g., SSS in $4^{th}$ Generation Long Term Evolution terminology). These signals can be designed to have superior auto-correlation or cross-correlation properties. The receiver can initiate a correlator (e.g., in either the frequency domain or the time domain) to detect these signals. The output of the correlator can provide several types of information including offset estimation and signal quality/strength. The signal quality information can be used to estimate the channel quality in the current beam-forming direction.

The transmission can include a stream of orthogonal frequency division multiplexing ("OFDM") symbols. The pilot symbols placed within the packet are known OFDM symbols. The receiver can perform a correlation against these pilot symbols, the error-vector magnitude ("EVM") of which can be used to estimate the channel quality.

The transmission can include symbols in an alternate domain (e.g., delay-Doppler domain, spatial domain). The transmission can include known symbols in this alternate transform domain. The receiver can then correlate against these known symbols, resulting in an estimate of the channel quality.

The transmission can include a stream of discrete packets, such as in a Wi-Fi-like system. Each packet can contain a known preamble that can facilitate the receiver to detect the packet boundary. The exemplary correlator used to detect this sequence (e.g., Zadoff-Chu sequence, or Schmidl-Cox, for example) can provide the signal strength or channel quality.

A window function (e.g., simple moving average or exponential smoothing) of the raw digital time-domain samples at the receiver (e.g., the output of the analog-to-digital converter) can be used as an estimate of the signal strength or channel quality. The bit error rate ("BER"), frame error rate ("FER"), or packet error rate ("PER") at the receiver can be used as a proxy for the current channel quality. The instantaneous channel quality estimates (e.g., derived from any of the above-mentioned procedures) can be averaged, so as to filter out noisy estimates. Alternatively or in addition, suitable outlier-detection procedures can be used to process the estimates.

Figure 4:
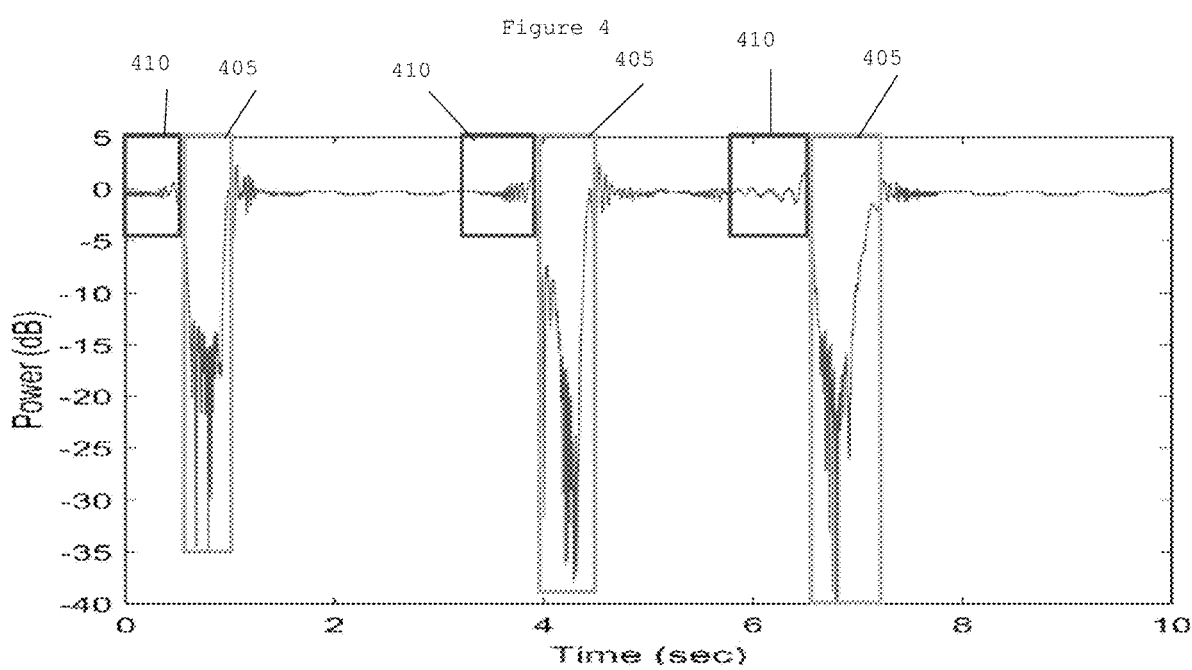
FIG. 4 is an exemplary timing diagram according to an exemplary embodiment of the present disclosure.

As shown in the block diagram of FIG. 1, TX 105 and RX 110 are communicating with one another. As the blocker in the environment begins to obstruct the signal, diffraction begins to take place. Diffraction can be the process where the wireless signal can "bend" around the object. Due to diffractive interference, the received signal power at the receiver can exhibit pulsation, or rapid variations in time, before the link quality degrades significantly. This is illustrated in FIG. 4, where the major degradations due to blockage are shown in boxes 405, but the preceding pulsations are shown in boxes 410. In particular, FIG. 4 shows an exemplary timing diagram according to an exemplary embodiment of the present disclosure. These pulsations, which can be referred to as "diffractive pulsations", can be beneficial, and can be used by the exemplary system, method and computer-accessible medium to determine a signal degradation.

Lower frequency signals (e.g., below 6 GHz in frequency) can exhibit Gaussian fading, and have larger wavelengths than high frequency waves. Consequently, the diffractive pulsations may not be as pronounced. Due to the highly specular nature of higher frequencies (e.g., millimeter wave signals) and the lower wavelengths, the diffractive pulsations are well pronounced as shown in the timing diagram of FIG. 4. The detection of diffractive pulsations (e.g., box 410 shown in FIG. 4) as a proxy to predict significant degradations in the signal quality (e.g., box 405 shown in FIG. 4) is described herein below.

The exemplary system, method and computer-accessible medium, according to certain exemplary embodiments of the present disclosure, can be used to process a time-series of instantaneous channel quality estimates, in order to predict an impending and dramatic signal blockage event before the severe degradation in signal quality occurs. This can include the measurement of the instantaneous channel quality in the desired directions, using any suitable method as understood by those having ordinary skill in the art. The underlying transceiver that can be used in making the measurements can have several embodiments known as "transceiver embodiments". The time series, including of the measurements of the instantaneous channel quality, can be stored over time. Filtering (e.g., data-smoothing) can be performed to de-noise the time-series described above. Data smoothing can be implemented using an exemplary moving-average filter or another suitable window function. Such exemplary filters can be based on feedback (e.g., infinite impulse response, or IIR filter), or as a weighted average of the previous k samples (e.g., this can be a finite impulse response, or FIR filter) that can optionally perform outlier detection and removal to de-noise the time-series described above. The exemplary system, method and computer-accessible medium, according to an exemplary embodiment of the present disclosure, can process, and can optionally de-noise, the time-series to detect "diffractive pulsations". Various exemplary suitable procedures can be applied on a time-series to detect these diffractive pulsations The receiver can use analog beamforming (e.g., phased array antennas) as the underlying transceiver technology. The receiver can use any suitable procedure to estimate the instantaneous channel quality in the current beamforming direction. The receiver can optionally perform this estimation in other directions by first steering the beam to an alternate direction, performing the estimation, and repeating the process for all desired angles of estimation.

The receiver can use hybrid beamforming as the underlying transceiver technology. This transceiver can facilitate the receiver to beam-form in m directions at a time (m can typically be small, and can be in the range of 2 to 4). The receiver can measure the instantaneous channel quality in m directions at the same time. The receiver can also optionally perform this estimation in other directions by steering the beams to these other directions, performing the estimation, and repeating the process for all desired angles of estimation.

The receiver can also use a fully digital transceiver as the underlying beam-former. If the transceiver has N antenna elements, the receiver can measure the instantaneous channel quality in N directions simultaneously.

Exemplary embodiments of the present disclosure can be applied whether the transceiver used is analog, hybrid, or fully digital, as described in the first, second, and third transceiver embodiments respectively.

A history of the instantaneous channel quality information can be maintained in a data structure (e.g., an array, linked list, FIFO queue, circular queue, etc.). Data corresponding to different directions can be stored in the same data structure, or different instances of the data structure. The data in this data structure can be passed to a computer processor that can be specifically programmed to detect the diffractive pulses in the data. The separation of the data structure from the processor can be for exposition only. The processor can store the time-series in its own internal data structures. The computer processor can execute "streaming logic", meaning that instead of an entire time-series being presented to it at a point in time, the measurements of instantaneous channel quality can be passed to it whenever they become available.

The computer processor can examine the time-series and produce a "yes/no" output indicating its prediction of whether a larger degradation in signal quality is impending, as explained below. Alternatively or in addition, the computer processor can output a number that indicates the confidence of its prediction, or its estimation of the probability of an impending and dramatic degradation in signal quality.

Figure 5:
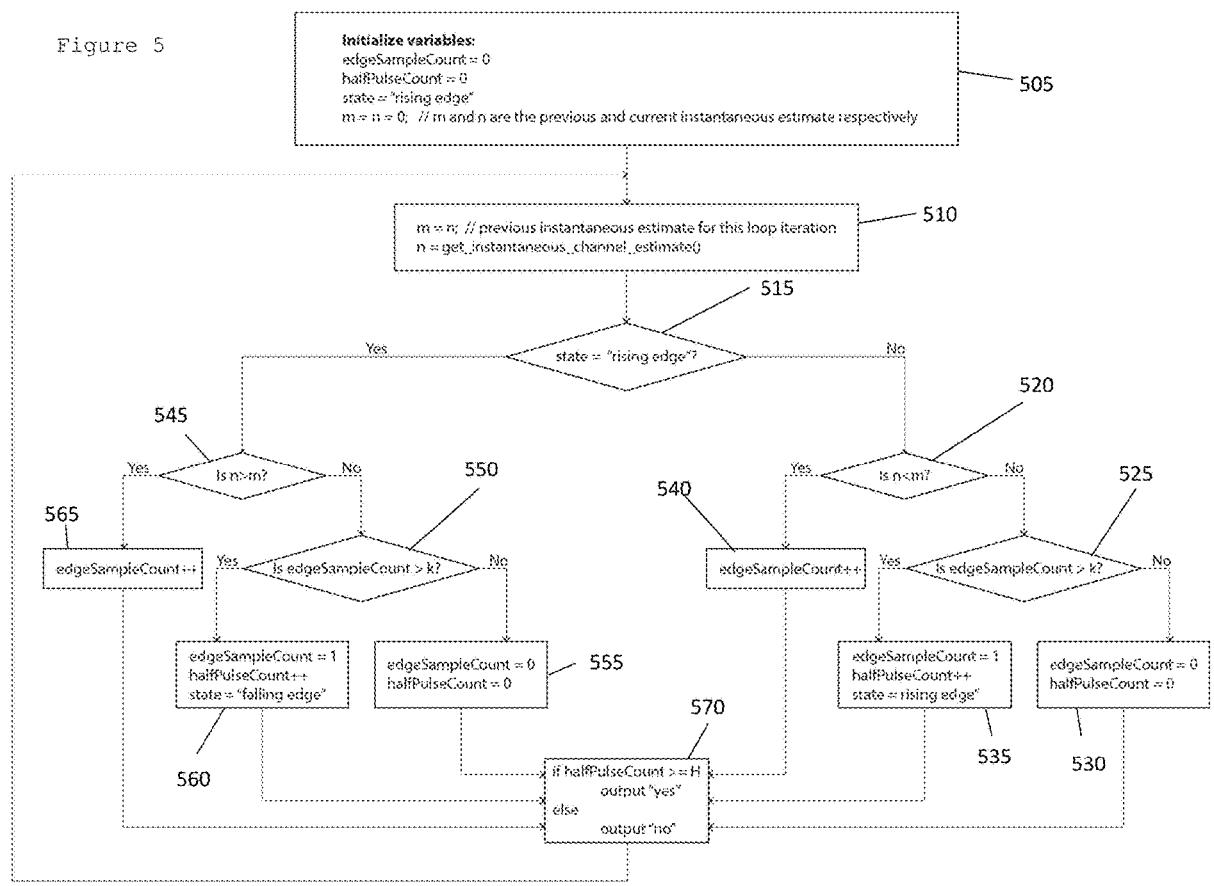
FIG. 5 is an exemplary flow diagram for determining a signal degradation according to an exemplary embodiment of the present disclosure.

The computer processor can use a state-machine to detect the diffractive pulses. The states of this machine can correspond to whether a rising edge or falling edge of the diffractive pulse of at least a certain duration k has been detected. If a programmable number of such pulses H has been detected, then the processor can present a "yes" output, indicating its prediction of an impending and pronounced blockage. FIG. 5 shows an exemplary flow diagram for determining a signal degradation according to an exemplary embodiment of the present disclosure, which can be implemented using an exemplary state machine, and which illustrates the case where a "yes/no" output can be produced. The exemplary state machine can be modified to produce a figure of confidence in its output. One example can be to present the value of H as the confidence metric, since the greater the number of detected diffractive pulsations, the greater can be the confidence that an impending and dramatic blockage can be about to occur.

As shown in the flow diagram of FIG. 5, at procedure 505, variables edgeSampleCount, halfPulseCount, m, and n can be set to 0. The state can be a rising edge. At procedure 510, if it is the first instantiation of the loop, then m and n can remain 0. Otherwise, m can be the estimate from the previous instantiation, and n can be the current estimate. At procedure 515, a determination can be made as to whether the state is a rising edge. If the state is not a rising edge, then at procedure 520, a determination can be made as to whether n is greater than m. If n is not greater than n, then at procedure 525, a determination can be as to whether edgeSampleCount is greater than K. If edgeSampleCount is not greater than k, then edgeSampleCount and halfPulseCount can be set to 0. If edgeSampleCount is greater than k, the edgeSampleCount can be set to 1, halfPulseCount can be incremented, and state can be set to rising edge at procedure 535. If n is less than m at procedure 520, then at procedure 540, edgeSampleCount can be incremented.

FIG. 5 illustrates that if state is a rising edge, then at procedure 545, a determination can be made as to whether n is greater than m. If n is not greater than m, then at procedure 550, a determination can be made as to whether edgeSampleCount is greater than k. If edgeSampleCount is not greater than k, then at procedure 555, edgeSampleCount and halfPulseCount can both be set to 0. If edgeSampleCount is greater than k, then at procedure 560, edgeSampleCount can be set to 1, halfPulseCount can be incremented, and the state can be set to falling edge. At procedure 545, if n is greater than m, then at procedure 565, edgeSampleCount can be incremented. At procedure 570, if halfPulseCount is greater than or equal to H, then a "yes" can be outputted (e.g., a determination can be made that there may be a signal degradation), if halfPulseCount is less than H, then a determination of "no" can be outputted (e.g., a determination that there may not be a signal degradation).

Figure 6:
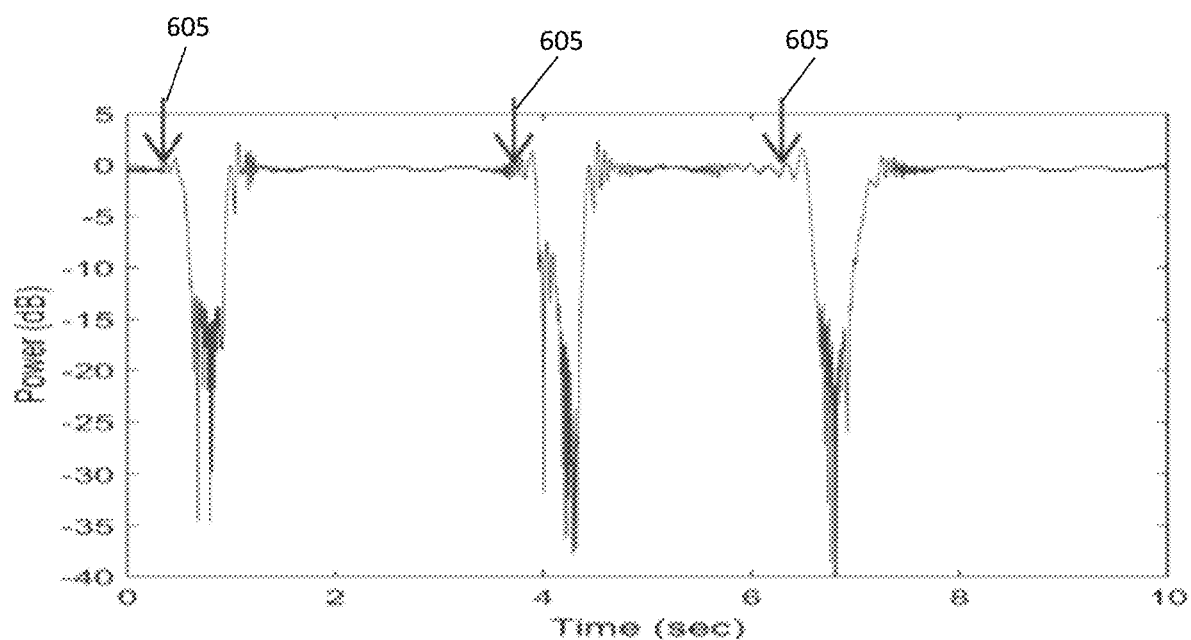
FIG. 6 is a further exemplary timing diagram according to an exemplary embodiment of the present disclosure.

FIG. 6 shows a further exemplary timing diagram according to an exemplary embodiment of the present disclosure. In particular, FIG. 6 shows the sample output where arrows 605 indicate where the exemplary system, method and computer-accessible medium produces a "yes" output. As illustrated in FIG. 6, the diffractive pulsations can be used by the exemplary system, method and computer-accessible medium to predict impending blockage, and the exemplary state machine described below with reference to FIG. 5 can detect these pulsations.

Figure 7:
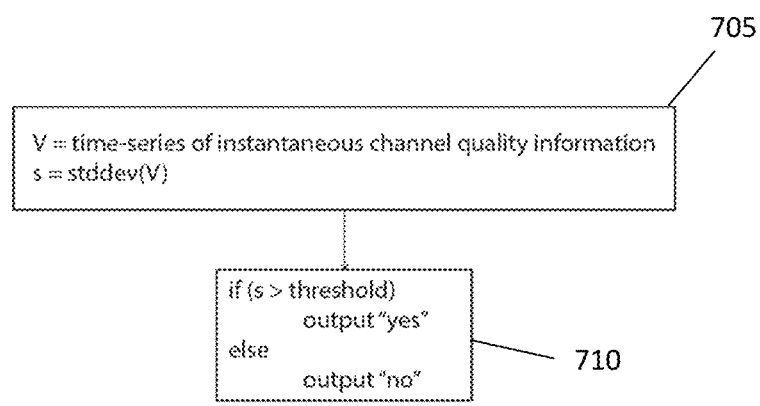
FIG. 7 is an exemplary flow diagram for predicting a dramatic and impending degradation in channel quality according to an exemplary embodiment of the present disclosure.

FIG. 7 shows an exemplary flow diagram for predicting a dramatic and impending degradation in channel quality according to an exemplary embodiment of the present disclosure. In particular, as shown in FIG. 7, the exemplary system, method and computer-accessible medium can utilize a statistical measure 705 (e.g., V, which can be a time-series of instantaneous channel quality information, and s, which can be the standard deviation of V) to detect the diffractive pulsations. At procedure 710, if the time-series of instantaneous channel quality information exhibits a standard deviation greater than a programmable threshold, the exemplary system, method and computer-accessible medium can indicate a "yes" prediction (e.g., a prediction of an upcoming signal degradation) for a dramatic and impending degradation in channel quality. If not, then a "no" can be predicted (e.g., no signal degradation is predicted).

The exemplary procedures described above can be augmented by state machines that can also detect a pronounced drop in signal quality. One example of such a state machine is illustrated in the exemplary diagram shown in FIG. 8. The exemplary state machine can detect a sharp degradation in channel quality if the time series demonstrates a drop in the channel quality for at least k samples, and the drop in the power can be at least D.

Figure 8:
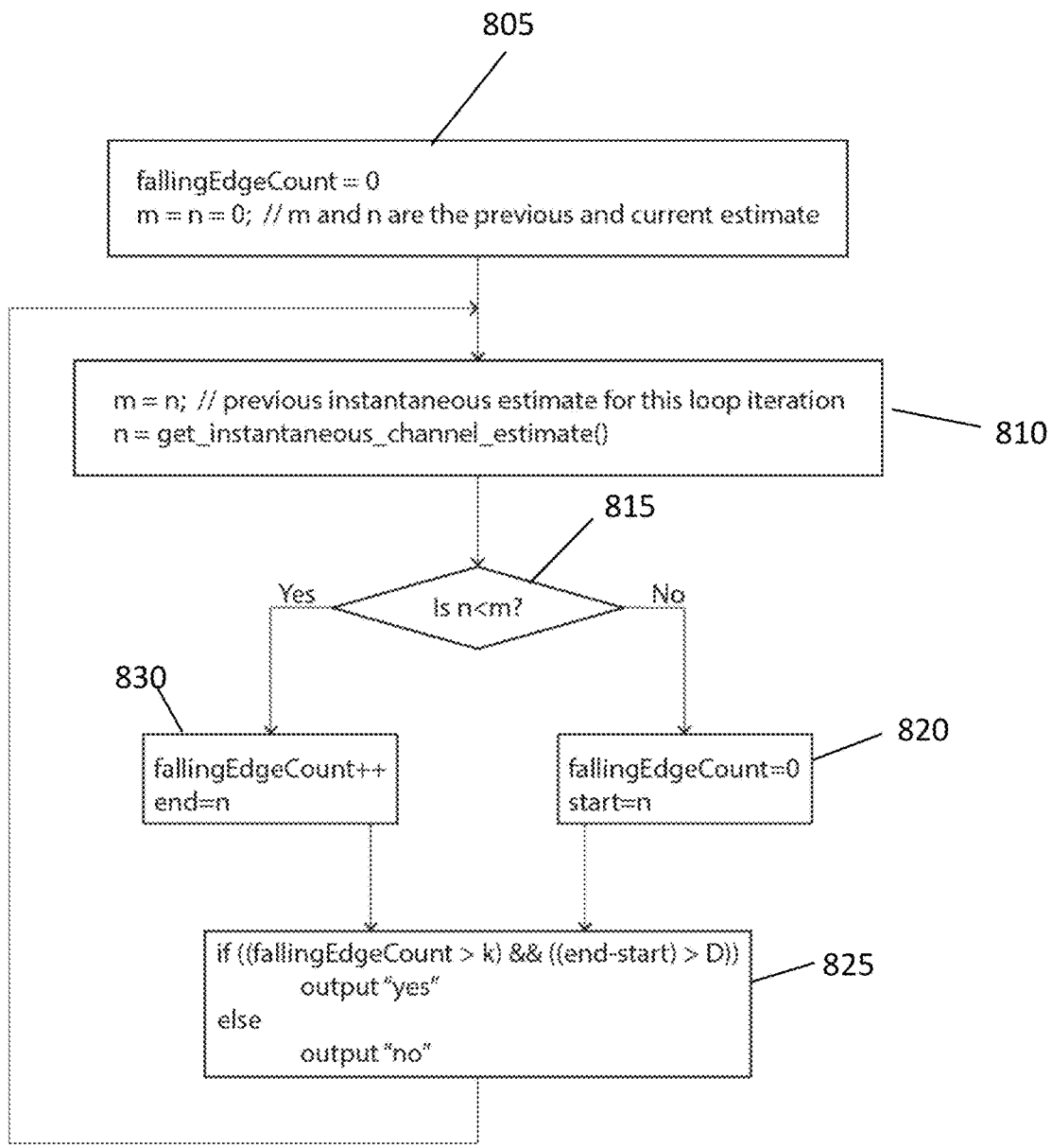
FIG. 8 is an exemplary diagram of a state machine according to an exemplary embodiment of the present disclosure.

For example, as shown at 805 of FIG. 8, the falling edge count can be 0, and m and n, which can be the previous and current estimates, respectively, can be 0. At procedure 810, m and n can be obtained, both of which can be 0 unless a previous instantaneous estimate for the loop iteration was performed, which resulted in n and m being a value other than 0. At procedure 815, a determination can be made as to whether n is less than m. If n is less than m, then the falling edge count can be incremented at procedure 830. At procedure 825, if the falling edge count is greater than a number k, then a yes can be produced, and the method can end, if not, then the output can be no, and the procedure can loop back to procedure 810 to be performed again. At procedure 815, if n is greater than or equal to m, then the falling edge count can be set to 0.

The computer processor can also be configured (e.g., using machine learning procedures) to detect diffractive pulses or impending degradations in signal quality. One exemplary machine learning procedure can be "supervised learning". This exemplary procedure can include two phases: i) a training phase; and ii) the operational phase. In the training phase, traces of known channel quality information time-series under blockage and non-blockage events can be used as the training data-set. During the operational phase, the time-series of instantaneous channel quality information can be used by the processor to detect the diffractive pulses. The output of such a procedure can be similar to that shown in FIG. 6.

Various exemplary transceivers, along with various exemplary processors can be used to detect the diffractive pulsations. Once the diffractive pulsations have been detected, the receiver can then pro-actively take steps to establish an alternate communication opportunity, before the impending and dramatic blockage event. Such exemplary procedures can include, but are not limited to: (i) switching communication directions; (ii) performing a scan for alternate directions of communication; (iii) establishing a connection with a different base station; (iv)) notifying the transmitter (e.g., through a reverse channel) about the impending blockage; (v) notifying the transmitter (e.g., through a reverse channel) about a possible alternate direction of communication; and so on.

Exemplary Detection of Diffractive Pulses

Diffractive pulsations can be viewed as being a series of rising edges and falling edges, which can alternate with each other; this is shown by boxes 410 in FIG. 4. The exemplary flowchart shown in FIG. 5 can be used to process a time-series of instantaneous channel quality estimates, in order to detect such diffractive pulses. Exemplary variables in the detector (e.g., as shown in FIG. 5) can include:

The state variable "state" denotes whether the edge that is currently being detected can be a "rising edge" or a "falling edge".

The variable "edgeSampleCount" can be used to count the number of contiguous samples in the currently being detected edge. This variable can be incremented in the following two conditions:

The currently being detected edge is a "rising edge" and the new sample "n" is greater than the previous sample "m". This can indicate that the rising edge is rising further.

The currently being detected edge is a "falling edge" and the new sample "n" is smaller than the previous sample "m". This can indicate the falling edge is falling further.

The variable "halfPulseCount" can be used to count the number of alternating rising and falling edges that have been detected so far. This variable can be incremented in the following two conditions:

A rising edge stopped rising, and the length of this rising edge (edgeSampleCount) was greater than a programmable threshold "k". This can indicate that the rising edge did indeed rise for at least a certain duration of time.

A falling edge stopped falling, and the length of this falling edge (edgeSampleCount) was greater than a programmable threshold "k" (e.g., which can be different for different cases). This can indicate that the falling edge did indeed fall for at least a certain duration of time.

When the number of detected edges (e.g., alternating rising and falling edges, each edge having at least a certain duration) is greater than a programmable threshold "H", the presence of a diffractive pulsation can been confirmed. In this exemplary scenario, the detector outputs "yes", and "no" otherwise. This decision stage at procedure 570 of FIG. 5.

For example, the value of "halfPulseCount" can be used to represent a confidence factor in the detection of the diffractive pulsations. The greater the number of alternating rising and falling edges (e.g., halfPulseCount), the more confident the detector can be that a diffractive pulsation has indeed been detected. Conversely, if the number of alternating rising and falling edges (e.g., halfPulseCount) can be smaller, it can indicate that the detector has a lower confidence that a diffractive pulsation has indeed been detected.

An exemplary system, method and computer-accessible medium for predicting impending degradation(s) in the wireless link quality in a wireless communication system, can include periodically estimating the wireless channel quality in at least the current beam-forming direction, maintaining a history of recently measured channel quality information, detecting the presence of diffractive pulses. These diffractive pulses can be used as a proxy to predict whether a blockage or link degradation event can be impending. The wireless channel quality can be estimated from reference signals within the transmission. The wireless channel quality can be estimated from data or pilot signals within the transmission. The wireless channel quality can be estimated from every symbol or sample, therefore becoming a continuous measurement. The wireless channel quality can be estimated in time domain, the frequency domain, or an alternate transform domain. A smoothing filter can be applied to the measured wireless channel quality information, so as to filter out noisy estimates. A list, queue, array or other data structure can be used to store the history of recently measured channel quality information. A state-machine can be used to process the history of recently measured channel quality information. A statistical metric (e.g., mean, variance, standard deviation, etc.) of the history of recently measured channel quality information can be used to predict if a blocking or link degradation event can be impending. A machine learning procedure can be employed to predict if a blockage or link degradation event can be impending. The prediction can be a "yes/no" result. The prediction can include a confidence factor. The receiver can maintain an independent history for different beam-forming directions and/or different transmitters or base stations.

The exemplary system, method, and computer-accessible medium, according to an exemplary embodiment of the present disclosure, can be used to trigger other actions if an impending blockage or degradation event can be predicted based on the detection of diffractive pulsations. The action can be to perform a scan in one or more other directions to find alternate signal paths to the same base station or transmitter. The action can be to perform a scan in the same direction to find alternate base stations or transmitters. The action can be to perform a scan in one or more other directions to find alternate base stations or transmitters. The action can be to switch to an alternate beam-forming direction in order to re-establish communications with a previously detected same or other base station. The prediction can be a "yes/no" result. The prediction can be a confidence value, and the action can be triggered if this confidence value can be greater than a threshold.

An exemplary apparatus can include a wireless receiver capable of performing beam-forming, the apparatus, a receive module, a processor, where the processor can be configured to estimate the channel quality information in any given beam-forming direction, write the channel quality information into a data structure meant to store recent history of the measured channel quality information, predict from this history as to whether a blockage or link degradation event can be impending, and trigger another action if such an impending event can be predicted. The channel quality information can be measured by a correlator, implemented either as hardware or software. The channel quality information can be measured from the data samples or symbols in time, frequency, or an alternate transform domain. The data structure can be a list, lookup table, array, queue, or other suitable data structure.

Figure 9:
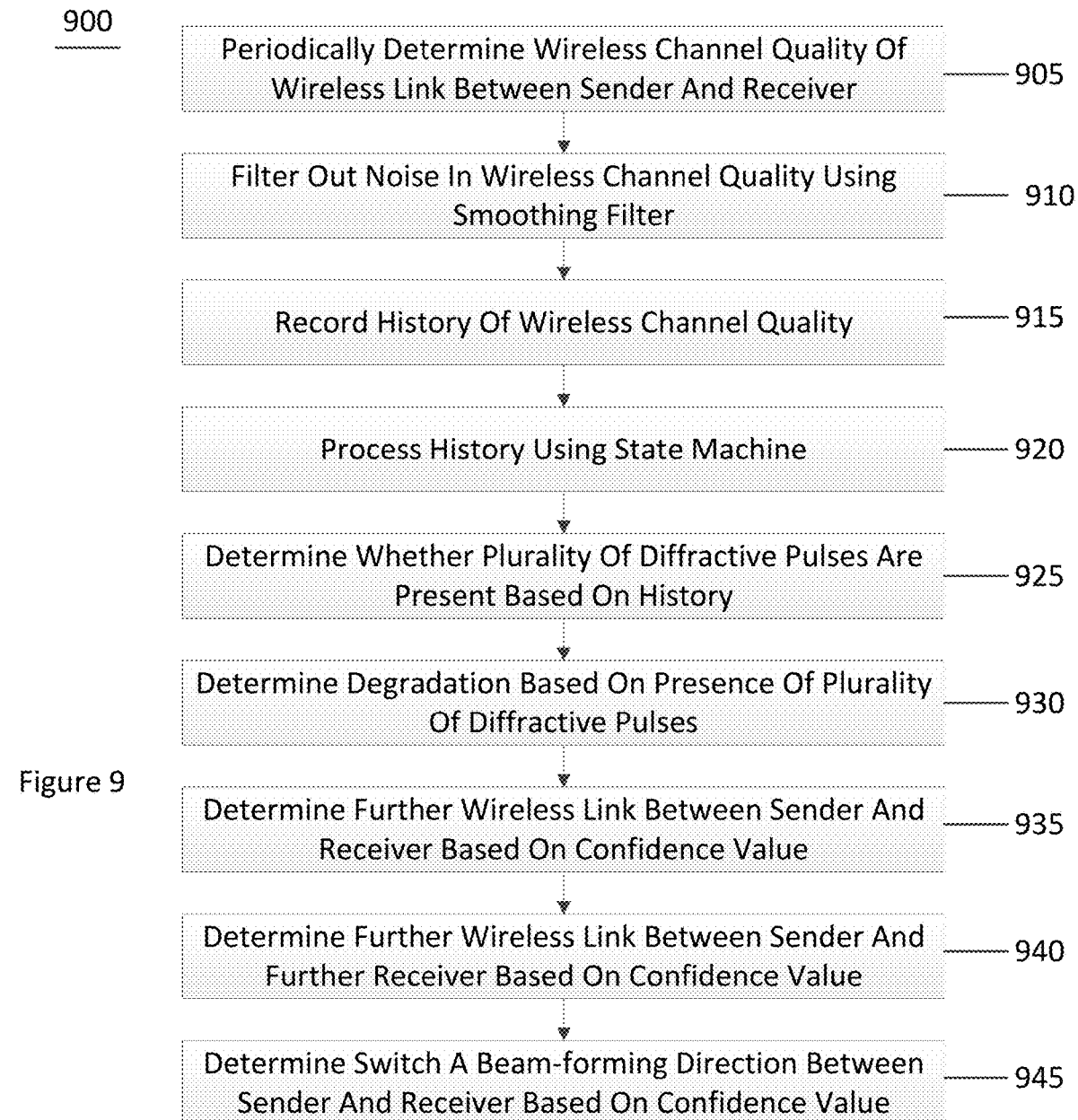
FIG. 9 is an exemplary flow diagram of an exemplary method for determining the signal degradation of a wireless link according to an exemplary embodiment of the present disclosure.

FIG. 9 shows an exemplary flow diagram of an exemplary method 900 for determining the signal degradation of a wireless link according to an exemplary embodiment of the present disclosure. For example, at procedure 905, a wireless channel quality of the wireless link between a sender and a receiver can be periodically determined. At procedure 910, noise in the wireless channel quality can be filtered our using a smoothing filter. At procedure 915, a history of the wireless channel quality can be recorded, which can then be processed using a state machine at procedure 920. At procedure 925, a determination can be made as to whether a plurality of diffractive pulses are present based on the history. At procedure 930, the signal degradation can be determined based on the presence of the plurality of diffractive pulses. At procedure 935, a further wireless link between the sender and the receiver can be determined based on the confidence value. At procedure 940, a further wireless link between the sender and a further receiver can be determined based on the confidence value. At procedure 945, a beam-forming direction between the sender and the receiver can be switched based on the confidence value.

Figure 10:
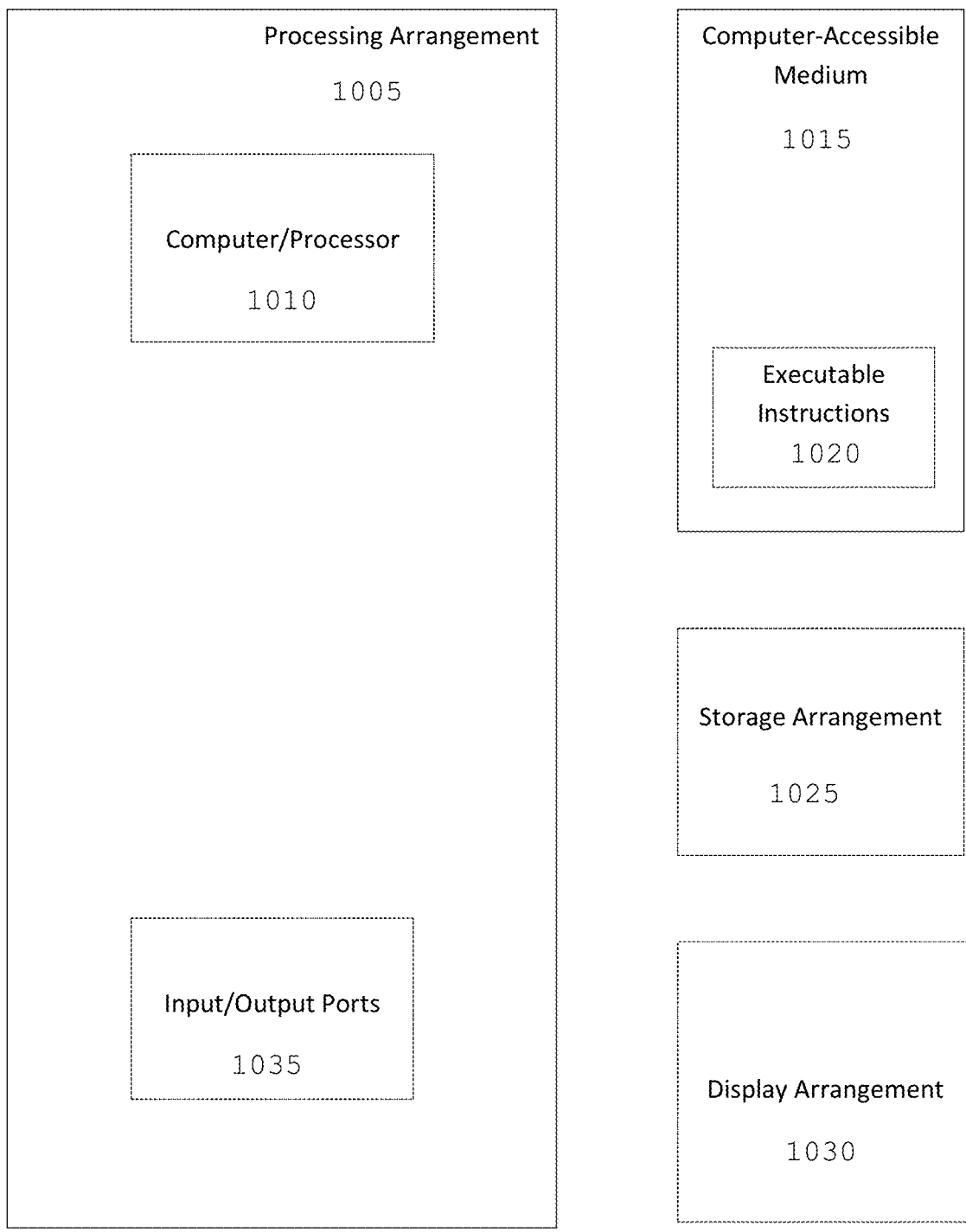
FIG. 10 is an illustration of an exemplary block diagram of an exemplary system in accordance with certain exemplary embodiments of the present disclosure.

FIG. 10 shows a block diagram of an exemplary embodiment of a system according to the present disclosure. For example, exemplary procedures in accordance with the present disclosure described herein can be performed by a processing arrangement and/or a computing arrangement (e.g., computer hardware arrangement) 1005. Such processing/computing arrangement 1005 can be, for example entirely or a part of, or include, but not limited to, a computer/processor 1010 that can include, for example one or more microprocessors, and use instructions stored on a computer-accessible medium (e.g., RAM, ROM, hard drive, or other storage device).

As shown in FIG. 10, for example, a computer-accessible medium 1015 (e.g., as described herein above, a storage device such as a hard disk, floppy disk, memory stick, CD-ROM, RAM, ROM, etc., or a collection thereof) can be provided (e.g., in communication with the processing arrangement 1005). The computer-accessible medium 1015 can contain executable instructions 1020 thereon. In addition or alternatively, a storage arrangement 1025 can be provided separately from the computer-accessible medium 1015, which can provide the instructions to the processing arrangement 1005 so as to configure the processing arrangement to execute certain exemplary procedures, processes, and methods, as described herein above, for example.

Further, the exemplary processing arrangement 1005 can be provided with or include an input/output ports 1035, which can include, for example a wired network, a wireless network, the internet, an intranet, a data collection probe, a sensor, etc. As shown in FIG. 10, the exemplary processing arrangement 1005 can be in communication with an exemplary display arrangement 1030, which, according to certain exemplary embodiments of the present disclosure, can be a touch-screen configured for inputting information to the processing arrangement in addition to outputting information from the processing arrangement, for example. Further, the exemplary display arrangement 1030 and/or a storage arrangement 1025 can be used to display and/or store data in a user-accessible format and/or user-readable format.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, and procedures which, although not explicitly shown or described herein, embody the principles of the disclosure and can be thus within the spirit and scope of the disclosure. Various different exemplary embodiments can be used together with one another, as well as interchangeably therewith, as should be understood by those having ordinary skill in the art. In addition, certain terms used in the present disclosure, including the specification, drawings and claims thereof, can be used synonymously in certain instances, including, but not limited to, for example, data and information. It should be understood that, while these words, and/or other words that can be synonymous to one another, can be used synonymously herein, that there can be instances when such words can be intended to not be used synonymously. Further, to the extent that the prior art knowledge has not been explicitly incorporated by reference herein above, it is explicitly incorporated herein in its entirety. All publications referenced are incorporated herein by reference in their entireties.

What is claimed is:

1. A non-transitory computer-accessible medium having stored thereon computer-executable instructions for determining at least one degradation of at least one wireless link, wherein, when a computer arrangement executes the instructions, the computer arrangement is configured to perform procedures comprising:
  periodically determining a wireless channel quality of the at least one wireless link between a sender and a receiver;
  recording at least one history of the wireless channel quality;

determining whether a plurality of diffractive pulses are present based on the at least one history using a state-machine to determine (i) at least two rising edges in at least one of the diffractive pulses, and (ii) at least two falling edges in at least one of the diffractive pulses; and determining the at least one degradation based on the presence of the plurality of diffractive pulses, wherein the determination of the at least one degradation (i) includes a prediction of the at least one degradation, and (ii) is performed using the state machine, and wherein the prediction includes a confidence factor.

2. The computer-accessible medium of claim 1, wherein the wireless channel is in a beam-forming direction.

3. The computer-accessible medium of claim 1, wherein the at least one degradation is an impending degradation.

4. The computer-accessible medium of claim 1, wherein the computer arrangement is configured to determine the wireless channel quality based on at least one reference signal in a transmission between the sender and the receiver.

5. The computer-accessible medium of claim 1, wherein the computer arrangement is configured to determine the wireless channel quality based on at least one pilot signal in a transmission between the sender and the receiver.

6. The computer-accessible medium of claim 1, wherein the computer arrangement is configured to determine the wireless channel quality in at least one of a time domain or a frequency domain.

7. The computer-accessible medium of claim 1, wherein the computer arrangement is further configured to filter out or reduce noise in the wireless channel quality using a smoothing filter.

8. The computer-accessible medium of claim 1, wherein the computer arrangement is configured to record the at least one history in a format of one of (i) a list, (ii) a queue, or (iii) an array.

9. The computer-accessible medium of claim 1, wherein the computer arrangement is configured to determine the at least one degradation using (i) a statistical metric, or (ii) a machine learning procedure.

10. The computer-accessible medium of claim 1, wherein the at least one history includes a plurality of histories, and wherein the computer arrangement is further configured to determine a first one of the histories for different beam forming directions, a second one of the histories for different senders, and a third one of the histories for different receivers.

11. The computer-accessible medium of claim 1, wherein the computer arrangement is further configured to determine at least one further wireless link between the sender and the receiver based on the at least one degradation.

12. The computer-accessible medium of claim 1, wherein the computer arrangement is further configured to determine at least one further wireless link between the sender and a further receiver based on the at least one degradation.

13. The computer-accessible medium of claim 1, wherein the computer arrangement is further configured to switch a beam-forming direction between the sender and the receiver based on the at least one degradation.

14. The computer-accessible medium of claim 1, wherein the determining the at least one degradation includes determining, using the computer arrangement, a confidence value for an impending degradation.

15. The computer-accessible medium of claim 14, wherein the computer arrangement is further configured to at least one of (i) determine at least one further wireless link between the sender and the receiver based on the confidence value, (ii) determine the at least one further wireless link between the sender and a further receiver based on the confidence value, or (iii) switch a beam-forming direction between the sender and the receiver based on the confidence value.

16. A system for determining at least one degradation of at least one wireless link, comprising:
a computer hardware arrangement configured to:
periodically determine a wireless channel quality of the at least one wireless link between a sender and a receiver;
recording at least one history of the wireless channel quality;
determine whether a plurality of diffractive pulses are present based on the at least one history using a state-machine to determine (i) at least two rising edges in at least one of the diffractive pulses, and (ii) at least two falling edges in at least one of the diffractive pulses; and
determine the at least one degradation based on the presence of the plurality of diffractive pulses,
wherein the determination of the at least one degradation (i) includes a prediction of the at least one degradation, and (ii) is performed using the state machine, and
wherein the prediction includes a confidence factor.

17. A method for determining at least one degradation of at least one wireless link, comprising:
periodically determining a wireless channel quality of the at least one wireless link between a sender and a receiver;
recording at least one history of the wireless channel quality;
determining whether a plurality of diffractive pulses are present based on the at least one history using a state-machine to determine (i) at least two rising edges in at least one of the diffractive pulses, and (ii) at least two falling edges in at least one of the diffractive pulses; and
using a computer hardware arrangement, determining the at least one degradation based on the presence of the plurality of diffractive pulses,
wherein the determination of the at least one degradation (i) includes a prediction of the at least one degradation, and (ii) is performed using the state machine, and
wherein the prediction includes a confidence factor.

* * * * *